Dec. 4, 1934.  E. KOENEMANN  1,982,745
METHOD OF TRANSFORMING HEAT ENERGY
Filed Jan. 29, 1929
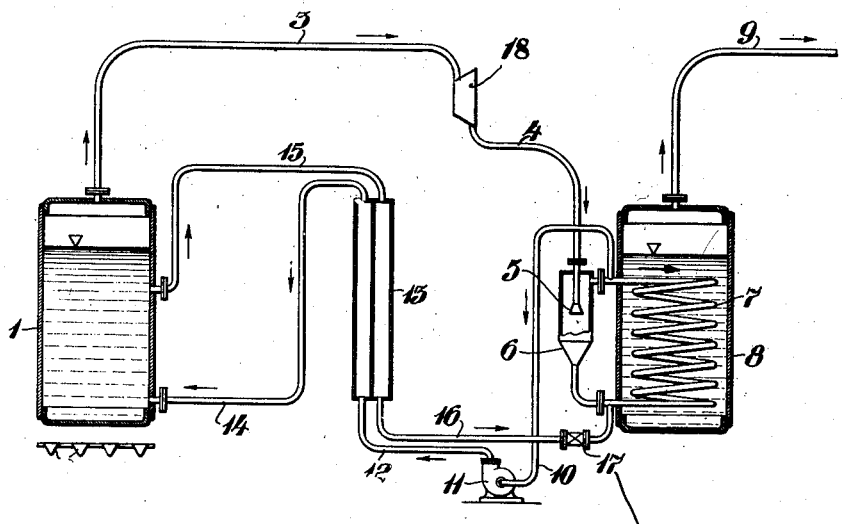
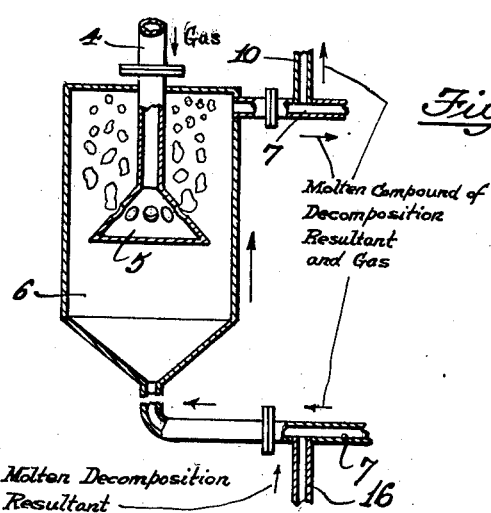
E. Koenemann
INVENTOR
By: Marks & Clerk
Attys.

Patented Dec. 4, 1934

1,982,745

UNITED STATES PATENT OFFICE 1,982,745

METHOD OF TRANSFORMING HEAT ENERGY

Ernst Koenemann, Berlin-Halensee, Germany, assignor to Gesellschaft für Drucktransformatoren (Koenemann-Transformatoren) G. m. b. H., Berlin, Germany, a corporation of Germany Application January 29, 1929, Serial No. 335,982
In Germany January 31, 1928

13 Claims. (Cl. 60—38)

This invention relates to the transformation of heat energy for power and other utilitarian purposes and aims to provide a novel method and means for this art.

Attempts have heretofore been made to obviate some of the difficulties and disadvantages encountered in the transformation of heat energy by the evaporation and condensation of a single heat carrier as practiced, for example, in the ordinary steam or mercury boiler, by the use of a gasiform heat carrier and an aqueous solution or an organic liquid by which the gasiform heat carrier may be absorbed and from which it may be evaporated at a temperature higher than its condensation temperature with alternate dilution and concentration of the solution.

However, such systems have been found to present many attendant difficulties, for instance; aqueous salt solutions which are suitable for this use (as aqueous solutions of caustic soda or caustic potash, used as auxiliary liquids with steam as the heat carrier) tend at high temperatures to corrode the material of the vessels and tubes; and if organic liquids are used decomposition of the auxiliary substance, as well as incrustations of the heating surfaces, are to be feared.

My invention aims to avoid such difficulties by the use of an entirely new cyclical system of heat transformation, according to which I generate a heat carrier by chemical decomposition of a chemical compound, preferably a water-free inorganic substance in molten state, by heating the same under pressure to chemically dissociate it into independent substances which may be chemically recombined to form the original compound after one or both of them has been used as a heat carrier.

Thus my invention is of generic character and in its broader aspects is not limited to any one of the class of substances mentioned, or to any particular apparatus; and the following description of preferred embodiments of my method and means and of a suitable system employing the same are to be considered as illustrative of my invention and not restrictively.

In the accompanying diagrams of this preferred embodiment, Fig. 1 is a representation of one form of system employing the invention and Fig. 2 a representation of the absorber 6 and associated parts on a larger scale.

In the preferred embodiment of my invention selected to illustrate the same I generate anhydrous ammonia gas by chemical decomposition of zinc chloride diammoniacate by heating the same under pressure to chemically dissociate it into zinc chloride monammoniacate and free ammonia gas, which substances may be chemically recombined to form the original compound after one or both of them has been used as a heat carrier. In the illustrative apparatus shown in the accompanying drawing, partly in vertical section and partly in elevation, the decomposition of the substance takes place in the generator 1 and the recombination in the mixer 5—6—7. The decomposable compound, in this illustrative example, molten $ZnCl_2(NH_3)_2$ or a molten mixture of $ZnCl_2(NH_3)_2$ and $ZnCl_2(NH_3)$, is continuously supplied to the boiler 1 by way of the conduit 14. The heat of the furnace diagrammatically indicated at 2 effects decomposition of at least a part of the $ZnCl_2(NH_3)_2$ producing therefrom free ammonia gas and the decomposition resultant, molten $ZnCl_2(NH_3)$.

The ammonia gas thus freed passes out of the boiler 1 through the pipe 3 and, after having energy usefully extracted therefrom, as by passing through a suitable turbine or other power generating engine 18 in which it performs work, continues with reduced pressure through the pipe 4 and the nozzle 5 into the mixing vessel 6. In the mixing vessel 6 the ammonia gas encounters the molten mixture of auxiliary liquid with a lesser content of ammonia which is at such a temperature that it can chemically combine with the ammonia arriving through the nozzle 5 to reform zinc chloride diammoniacate from at least a part of the zinc chloride monammoniacate present in the mass.

The heat developed by this exothermal chemical recombination is dissipated by conducting the mass in the mixing vessel 6 in heat exchange relation with water contained in a vessel 8, as by means of a helical pipe 7 in circuit with the mixing vessel 6; the steam produced in the vessel 8 being conducted to any suitable consumption place by means of the pipe 9 for use thereat.

The direction of flow through the circuit 6—7 may be controlled as desired. For example, in the arrangement shown the "air-lift" effect of the bubbles of gas issuing from the nozzle 5 to be absorbed as they rise through the liquid (see Fig. 2), together with the thermosyphon action resulting from generation of heat in the mixer 6 and cooling in the coil 7, may be relied upon to cause clockwise circulation through the circuit 6, 7. Various other modes of producing circulation are of course known to those skilled in the art, and may of course be employed without departing from my invention.

The generator or boiler 1, in which the ammonia is split off, and the vessel 6, in which the same amount of ammonia is being brought into recombination, are interconnected in the form shown to provide for circulation of the liquid decomposition resultant from the boiler 1 to the vessel 6, and of the recombined fluid from the vessel 6 to the boiler 1.

In the arrangement shown the liquid decomposition resultant flows from the boiler 1, which may be termed the heated or decomposition zone, through the pipe 15, the exchanger 13 where heat is usefully extracted from it, and the pipe 16, to a throttle valve or regulating valve 17. The liquid, under substantially boiler pressure up to the entering side of the valve 17, is reduced in pressure as it passes through this valve in restricted amount to the low pressure recombining and cooling system 6, 7, to recombine with the ammonia vapor therein, and circulate and be cooled therein, as aforesaid.

The valve 17 may be of any known or suitable construction, for example one may employ a manually adjusted valve like that shown in U. S. Patent No. 692,391, granted February 4, 1902 to Anton Wagner, or that of U. S. Patent No. 794,267, granted July 11, 1905 to John C. Wills. With such manually operated valves 17 variation in the output of the turbine or other heat extractor 18, causing changes of pressure in the system, will have to be compensated for from time to time, but obviously any suitable automatic regulating valve, of which many types are known to those skilled in the art, may be used to effect this compensation. Automatic pressure maintaining valves are of course well known, as are valves for automatically maintaining constant levels. For an example of the latter see U. S. Patent No. 1,809,535, granted June 9, 1931 to Egidio Torre. Obviously in applying such a valve to the present system the valve can be regulated by the liquid level in the boiler 1 or by the liquid level in the mixer 6 (in which the liquid level would be maintained above the level of the outlet to the coil 7 and pump 11) and such application would enable the pressure due to variable output of the turbine 18 to rise or fall without danger of too much or too little liquid passing between the boiler and the mixer. The type of valve 17 employed, and the mode of controlling the same are immaterial to the present invention, which contemplates in the valve 17 simply an illustrative means for controlling the flow of liquid from the boiler-pressure zone to the absorber-pressure zone as above set forth, and the suitable forms of valve cited are described herein merely in the interest of completeness of disclosure.

The return of recombined fluid to the boiler 1 is accomplished, in the form shown, by a pump 11, which withdraws recombined liquid from the system 6, 7 by way of the pipe 10, and forces it through the pipe 12, exchanger 13, and pipe 14, into the boiler 1, against the pressure therein. In the form shown, the heat usefully extracted from the liquid decomposition resultant in the exchanger 13 is usefully applied to partially reheat the recombined liquid returning to the boiler 1, thus reducing the amount of heat necessary to be supplied to the boiler 1.

With this illustrative arrangement it is a matter of course that the liquid withdrawn from the system 6—7 by way of the pipe 10 and pump 11 will be at such temperature as to cool the liquid from the boiler 1, in the heat exchanger 13, sufficiently to condition it for chemical recombination with the cooled gas entering the system 6—7 by way of the conductor 4—5.

The broad aspect of the invention resides in heating and chemically decomposing the disclosed sort of molten chemical compounds into a heat carrier and a decomposition resultant, conditioning the latter for chemical recombination and effecting chemical recombination of the same, with useful extraction of heat from one or more points in the system; and the heat exchanger 13, while preferred to minimize the heat required to be supplied to the boiler 1, is at the same time illustrative of the numerous modes by which the liquid flowing from the boiler 1 to the system 6—7 might be cooled and conditioned for recombination. Similarly, the system 6—7 itself, while a preferred embodiment, is at the same time illustrative of various modes of providing recombined substance at a temperature suitable, in the preferred embodiment, for cooling the fluid passing in heat exchange relation to it in the exchanger 13, and my invention in its broader aspects is not limited to the extraction of the particular heat developed by chemical recombination before returning the recombined fluid to be again dissociated, as it will be clear that even in the preferred embodiment, with clockwise circulation as shown, a part of the heat of recombination resides in the liquid drawn out through the pipe 10 by the pump 11, and the cooling of the rest of the liquid in the pipe 7 and mingling of the same with the liquid introduced through the valve 17, is simply one way, though a very desirable one, of conditioning the liquid entering the mixer 6, so that it may recombine with the gas supplied thereto, under the pressure desired with the heat of the recombined fluid at the temperature desired, below the decomposition temperature at said pressure. It is of course obvious that the relative proportion of recombining liquid and gas to the total amount of liquid circulated, will determine the total rise in temperature of the total quantity of liquid, effected by the heat of recombination of a part of it in the mixer 6.

In the above illustrative description I have explained a preferred embodiment of my invention comprising the useful application in a method of transforming heat of the reversible dissociation of diammoniacate chloride of zinc, but there are other similar auxiliary compounds suited for the purpose in view, for instance the ammoniacates of other metal halogenides, and also mixtures of ammoniacates which are important for varying the congealing point of the auxiliary liquid may be used.

It is a matter, of course, that also other inorganic substances in liquid state, insofar they are able to give off a chemically bound gasiform heat carrier and take it up again in alternation, can be used. The substances or compounds concerned are especially salts with apposed gases, such as $SO_2$, $CO$, $CO_2$, and $NH_3$; a suitable salt is, for instance $AlCl_3SO_2$. And there may be used also the ammonia salts of the phosphoric acid which when being heated give off ammonia and get converted into phosphates with a lesser contents of ammonia, but take up the ammonia again when their temperature is lowered, and are, thus, re-converted into a phosphate with a larger contents of ammonia. By way of example I mention $(NH_4)_4P_2O_7$.

Hence the above particularized description of an illustrative embodiment of my invention, comprising the useful application in a method of transforming heat of the reversible dissociation of an inorganic molten salt, is not to be considered as limiting my invention to the use of di-ammoniacate chloride of zinc as the molten medium. Thus in the broad aspects of my invention, the $ZnCl_2(NH_3)_2$ represents any suitable dissociable chemical compound or auxiliary substance, and the $NH_3$ and $ZnCl_2NH_3$ represent the products of dissociation thereof, employed as heat-carriers according to my invention, and from which heat may be usefully extracted.

I accordingly claim as my invention:—

1. The method of transforming heat from a heated zone which consists in picking up said heat by introducing into said heated zone a liquid material comprising an apposed gas chemically associated therein, said material being adapted to endothermally dissociate into said gas and a residual decomposition resultant, utilizing a part of the sensible heat of said gas to lower its temperature, extracting a part of the sensible heat of said residual decomposition resultant to lower its temperature, effecting chemical reassociation of said cooled residual decomposition resultant and gas to recover the exothermal heat of association thereof as sensible heat, utilizing the sensible heat thus created, and returning said liquid material with its residual heat energy for re-dissociation in said heated zone.

2. A binary chemical cycle for heat transformation consisting in applying heat to a liquid comprising water-free $ZnCl_2(NH_3)_2$ to dissociate $ZnCl_2(NH_3)_2$ into $ZnCl_2(NH_3)$ and $NH_3$, said heat being applied at a temperature determined by the temperature of dissociation of $ZnCl_2(NH_3)_2$ at a pressure determined by the pressure of dissociated $NH_3$ desired; withdrawing said high temperature high pressure $NH_3$ and usefully extracting sensible heat therefrom reducing it to a condition capable of recombining with $ZnCl_2(NH_3)$ to form $ZnCl_2(NH_3)_2$; withdrawing the liquid from which the $NH_3$ has been dissociated and usefully extracting sensible heat therefrom reducing it to a temperature suitable for recombination of the $ZnCl_2NH_3$ with the conditioned $NH_3$; effecting chemical recombination of the cooled $ZnCl_2NH_3$ and conditioned $NH_3$; utilizing the heat developed by the reaction of combination thereof; and returning the recombined liquid and gas for redissociation.

3. A binary cycle for transforming heat energy consisting in applying heat to an auxiliary liquid with which a gas is dissociably chemically combined at the temperature of dissociation thereof corresponding to the pressure maintained thereon to chemically dissociate the gas from the said auxiliary liquid; withdrawing the high-temperature high-pressure gas developed and usefully extracting sensible heat therefrom reducing the gas to a condition capable of chemical recombination with suitably cooled auxiliary liquid; withdrawing auxiliary liquid from which gas has been dissociated and usefully extracting heat therefrom to render it capable of chemical recombination with said conditioned gas; effecting said chemical recombination and utilizing sensible heat developed by the reaction of recombination; and returning the thus formed dissociably chemically combined gas and auxiliary liquid for re-dissociation.

4. A heat transforming system incorporating a binary chemical cycle which comprises heating a boiler containing a water-free liquid comprising $ZnCl_2(NH_3)_2$ to dissociate the same therein into $ZnCl_2(NH_3)$ and $NH_3$ gas at a high temperature and pressure, conducting the high-pressure high-temperature $NH_3$ gas from said boiler to a means for usefully extracting part of the energy thereof, conducting partially dissociated residual liquid from said boiler through a heat interchanger and a pressure-reducing device to reduce its temperature and pressure and then, at such reduced temperature and pressure, to a chemical-condenser or mixing vessel, conducting the $NH_3$ gas from which energy has been extracted to said chemical-condenser or mixing vessel, and therein effecting recombination or chemical-condensation of said $NH_3$ gas by the residual liquid of reduced temperature and pressure, passing the recombined liquid from said chemical-condenser through a heat exchanger and abstracting therein heat developed by the recombination of $NH_3$ and $ZnCl_2(NH_3)$ to form $ZnCl_2(NH_3)_2$, and pumping recombined liquid from said mixing-vessel-heat-exchanger system and forcing it into said boiler against boiler pressure.

5. The improvement in the art of transforming heat for power purposes and the like by a system in which a gaseous heat carrier is driven out of an auxiliary liquid by the application of heat thereto and, after useful extraction of heat therefrom, reincorporated therein; which improvement consists (1) in employing as the auxiliary liquid in such system a molten chemical salt such as $ZnCl_2(NH_3)$, and (2) in employing therewith as the gaseous heat carrier a gas such as ammonia; said salt and gas being of such character that the said gas is able to enter exothermally into a solely chemical combination with the said molten chemical salt to form therewith a more complex chemical compound, such as $ZnCl_2(NH_3)_2$, which more complex compound is of a character endothermally decomposable by the application of heat; substantially as and to obtain the advantages described.

6. In the art of transforming heat from a heated zone by using an auxiliary liquid according to a method which comprises utilizing said heat to drive out of the auxiliary liquid a gaseous component and leave a residual liquid component, extracting a part of the sensible heat of said gaseous component to lower its temperature, extracting a part of the sensible heat of said residual liquid component to lower its temperature, effecting reassociation of said cooled gaseous component and residual component to recover the exothermal heat of association thereof as sensible heat, and returning the auxiliary liquid with its residual heat energy for re-separation in said heated zone; an auxiliary liquid for such art comprising, in molten state, a water-free complex salt such as zinc chloride ammoniacate, solid at atmospheric temperature and pressure, having solely chemically combined therewith to form a more complex molten compound, a chemical such as ammonia, gasiform at atmospheric temperature and pressure, and chemically dissociable from the more complex molten compound endothermally to be freed as the gaseous component, leaving the chemically released water-free complex salt as the residual molten component, and solely chemically reassociable with the molten residual component exothermally to re-form by chemical combination the more complex compound.

7. The method consisting in subjecting molten zinc chloride ammoniacate to a high temperature to decompose it under pressure into gasiform ammonia and a second zinc chloride ammoniacate with a lower content of ammonia, extracting heat from the gasiform ammonia, extracting sensible heat from the second zinc chloride ammoniacate, introducing the cooled gasiform ammonia into the second zinc chloride ammoniacate to recombine therewith to re-form said first zinc chloride ammoniacate with development of heat at a temperature corresponding to that of steam under pressure, usefully extracting heat developed by the recombination at such temperature, and returning said reformed zinc chloride ammoniacate for re-decomposition.

8. The method consisting in subjecting a water-free liquid dissociable chemical compound such as molten zinc chloride ammoniacate to a high temperature to decompose it under pressure into a gasiform agent and a water-free liquid decomposition resultant, such as gasiform ammonia and a second zinc chloride ammoniacate with a lower content of ammonia, extracting heat from the gasiform agent, extracting heat from the water-free liquid decomposition resultant, introducing the cooled gasiform agent into the water-free liquid decomposition resultant to recombine therewith to reform said first water-free liquid compound with development of heat at a temperature corresponding to that of steam under pressure, extracting the heat developed by the re-combination at such temperature, and returning said reformed water-free liquid compound for re-decomposition.

9. The method of transforming heat and energy consisting in utilizing as heat transforming substances a cooperating liquid and a gasiform agent capable of exothermally combining with each other to form a molten substance which is capable of being endothermally dissociated at high temperatures and usual pressures, circulating the molten substance to a heated dissociation zone from a recombination zone, effecting a combination of the gasiform agent with the cooperating liquid at the recombination zone and dissociation of the substance at the dissociation zone, separately circulating the cooperating liquid and dissociated gasiform constituent from the dissociation zone to the recombination zone, and usefully extracting energy carried from the heated zone at a desired point in the circulating systems.

10. A method according to claim 9 characterized in that the gasiform constituent is chosen from a group comprising $SO_2$, $CO$, $CO_2$ and $NH_3$, for example, and the cooperating liquid chosen from the metal salts capable of forming compounds with the gasiform constituents bound therein as a so-called "apposed gas".

11. A method according to claim 9 characterized in that the chosen gasiform constituent is $NH_3$, and the chosen cooperating liquid includes $ZnCl_2(NH_3)$.

12. A method according to claim 9 characterized in that the chosen gasiform constituent is $NH_3$, and the chosen cooperating liquid includes a phosphoric acid salt and ammonia.

13. The method consisting in utilizing the endothermal dissociation of a non-aqueous molten chemical compound containing a combined gas, such as fused zinc chloride ammoniacate, to pick up heat from a heated zone thereby producing a gasiform constituent, such as ammonia, and a liquid decomposition resultant, such as a second zinc chloride ammoniacate with a lower content of ammonia, withdrawing the dissociated constituents from the heated zone and circulating them to a zone of recombination, effecting exothermal recombination thereof at said latter zone, returning the recombined gas containing compound to the heated zone for redissociation, and usefully applying heat picked up at the heated zone at a desired point in the circulating systems.

ERNST KOENEMANN.